(12) United States Patent
Mannikka

(10) Patent No.: US 9,408,043 B2
(45) Date of Patent: Aug. 2, 2016

(54) DETECTING THE PRESENCE OF A HANDHELD COMMUNICATION DEVICE IN A VEHICLE

(71) Applicant: General Motors LLC, Detroit, MI (US)

(72) Inventor: Matthew R. Mannikka, Detroit, MI (US)

(73) Assignee: General Motors LLC, Detroit, MI (US)

( * ) Notice: Subject to any disclaimer, the term of this patent is extended or adjusted under 35 U.S.C. 154(b) by 66 days.

(21) Appl. No.: 14/282,840

(22) Filed: May 20, 2014

(65) Prior Publication Data

US 2015/0341757 A1 Nov. 26, 2015

(51) Int. Cl.
*H04W 4/04* (2009.01)
*H04B 1/3822* (2015.01)
*H04L 29/08* (2006.01)
*H04W 4/00* (2009.01)

(52) U.S. Cl.
CPC ............ *H04W 4/046* (2013.01); *H04B 1/3822* (2013.01); *H04L 29/08* (2013.01); *H04L 67/12* (2013.01); *H04W 4/00* (2013.01); *H04W 4/008* (2013.01); *H04W 4/04* (2013.01)

(58) Field of Classification Search
CPC .................................................. H04W 64/00

USPC ............................................ 455/456.1–456.5
See application file for complete search history.

(56) References Cited

U.S. PATENT DOCUMENTS

| | | | | |
|---|---|---|---|---|
| 7,579,938 | B2* | 8/2009 | Teshima | B60R 25/24 340/10.1 |
| 7,966,111 | B2* | 6/2011 | Moinzadeh | B60R 25/00 379/201.01 |
| 2005/0128076 | A1* | 6/2005 | Shinada | G08B 13/1427 340/539.11 |
| 2013/0012123 | A1* | 1/2013 | DeLuca | A45C 13/18 455/39 |
| 2014/0113619 | A1* | 4/2014 | Tibbitts | G07C 5/008 455/419 |

* cited by examiner

*Primary Examiner* — Michael T Vu
(74) *Attorney, Agent, or Firm* — Christopher DeVries; Reising Ethington P.C.

(57) ABSTRACT

A system and method for determining whether a handheld communication device (HCD) is located inside a vehicle includes: receiving at a central facility a request to locate the HCD; sending a message to the vehicle with an instruction to determine if the HCD is present in the vehicle; receiving a response from the vehicle that indicates whether or not the HCD is present in the vehicle; and transmitting a message to a user of the HCD indicating whether the HCD is located inside of the vehicle.

15 Claims, 2 Drawing Sheets

DETECTING THE PRESENCE OF A HANDHELD COMMUNICATION DEVICE IN A VEHICLE

TECHNICAL FIELD

The present invention relates to handheld communication devices used in vehicles and, more particularly, to remotely determining the absence or presence of the devices in vehicles.

BACKGROUND

Modern vehicles are frequently equipped with a vehicle telematics unit that can monitor vehicle functions and also provide the capability to wirelessly communicate voice and data transmissions to and from the vehicle. Apart from the communications functionality offered by the vehicle telematics unit, it is increasingly common for vehicle owners to carry handheld wireless devices, such as smart phones, when they use the vehicle. When the vehicle owner ultimately leaves the vehicle, the handheld wireless devices can sometimes be mistakenly left behind. The vehicle owner may later realize that the handheld wireless device is missing and recall using it in the vehicle. However, sometimes the vehicle owner realizes this when they are a significant distance from the vehicle, which would make personally checking the vehicle for the handheld wireless device inconvenient.

SUMMARY

According to an embodiment, there is provided a method of determining whether a handheld communication device (HCD) is located inside a vehicle. The method includes receiving at a central facility a request to locate the HCD; sending a message to the vehicle with an instruction to determine if the HCD is present in the vehicle; receiving a response from the vehicle that indicates whether or not the HCD is present in the vehicle; and transmitting a message to a user of the HCD indicating whether the HCD is located inside of the vehicle.

According to another embodiment, there is provided a method of determining whether an HCD is located inside a vehicle. The method includes receiving at a central facility a request to locate the HCD; sending a message to the vehicle with an instruction to begin listening for an acoustical signal that is generated by the HCD; sending a message to the HCD with an instruction to generate the acoustical signal; determining whether the acoustical signal is detected at the vehicle; and transmitting a message to a user of the HCD indicating whether the HCD is located inside of the vehicle.

According to yet another embodiment, there is provided a method of determining whether an HCD is located inside a vehicle. The method includes receiving at the vehicle an instruction to begin listening for an acoustical signal generated by the HCD; listening for the acoustical signal at the vehicle; detecting the absence or presence of the acoustical signal generated by the HCD at the vehicle; and transmitting a message to a central facility indicating whether the vehicle detected the acoustical signal.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below determines whether a handheld communication device (HCD) is located in a vehicle. A vehicle owner or user may unintentionally leave an HCD in the vehicle and later wonder where the HCD is located. Sometimes it is easy to determine whether or not the HCD is in the vehicle. For example, if the vehicle owner lives in a single family home and the vehicle is parked in a garage attached to the home, the owner can easily walk into the garage and check the vehicle to determine if the HCD is inside. However, sometimes determining whether the HCD has been misplaced by leaving it in the vehicle is not so convenient. Often the vehicle is parked a significant distance from the vehicle owner when the owner discovers that the HCD is missing. Such a situation exists when a vehicle owner lives or works in a large building, such as a skyscraper. Large residential or commercial buildings may include many separate floors of living or working space. The parking spaces of these buildings can be located in the basement or several blocks away from the building. Hypothetically speaking, if the vehicle owner parked a vehicle in the basement of a building, travelled to the 60th floor of the building where he lives, and then discovered his HCD is missing, returning to the vehicle to search for the HCD may be inconvenient. Methods of locating HCDs using global positioning system (GPS) coordinates exist, such as the "find my iPhone" feature provided by Apple. However, the GPS coordinates obtained by the HCD are not usually accurate enough to pinpoint whether or not the HCD is located in a vehicle or at some other nearby location.

The vehicle owner can contact a central facility to determine if the HCD he uses or owns is in the vehicle. The central facility can transmit a message to the vehicle instructing it to detect if the HCD is in the vehicle or not. The vehicle can detect if the HCD is linked with a vehicle telematics unit via a short-range wireless link. When such a link exists, the vehicle can respond to the central facility with a message indicating that the HCD is in the vehicle. Alternatively, the central facility can transmit a message to the vehicle instructing it to listen for an acoustical signal generated by the HCD. Another message can be transmitted to the HCD instructing it to generate the acoustic signal. When the HCD is in the vehicle, the acoustical signal can be detected by the vehicle. The vehicle can then generate a message indicating whether or not the acoustical signal was detected by the vehicle and transmit that message to the central facility. The central facility can then tell the vehicle owner whether or not the HCD is located in the vehicle. This information can save the vehicle owner a long walk or trip to the vehicle when the HCD is not located in the vehicle.

Figure 1:
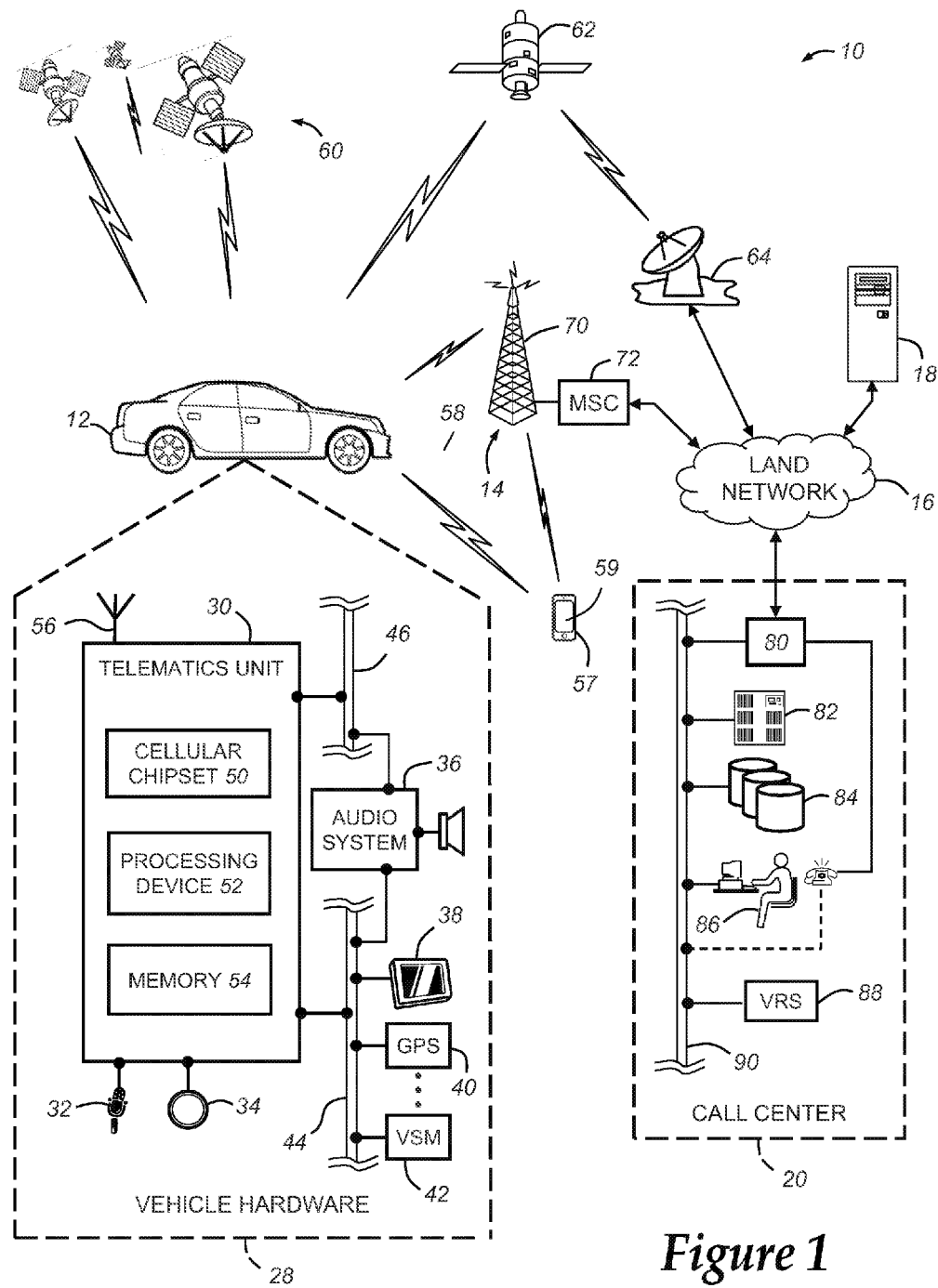
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a handheld communication device (HCD), such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. While the smart phone 57 may include the ability to communicate via cellular communications using the wireless carrier system 14, this is not always the case. For instance, Apple manufactures devices such as the various models of the iPad™ and iPod Touch™ that include the processing capability, the display 59, and the ability to communicate over a short-range wireless communication link. However, the iPod Touch™ and some iPads™ do not have cellular communication capabilities. Even so, these and other similar devices may be used or considered a type of HCD, such as the smart phone 57, for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities.

In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1xEV-DO) or GSM/GPRS (e.g., 4G LTE). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
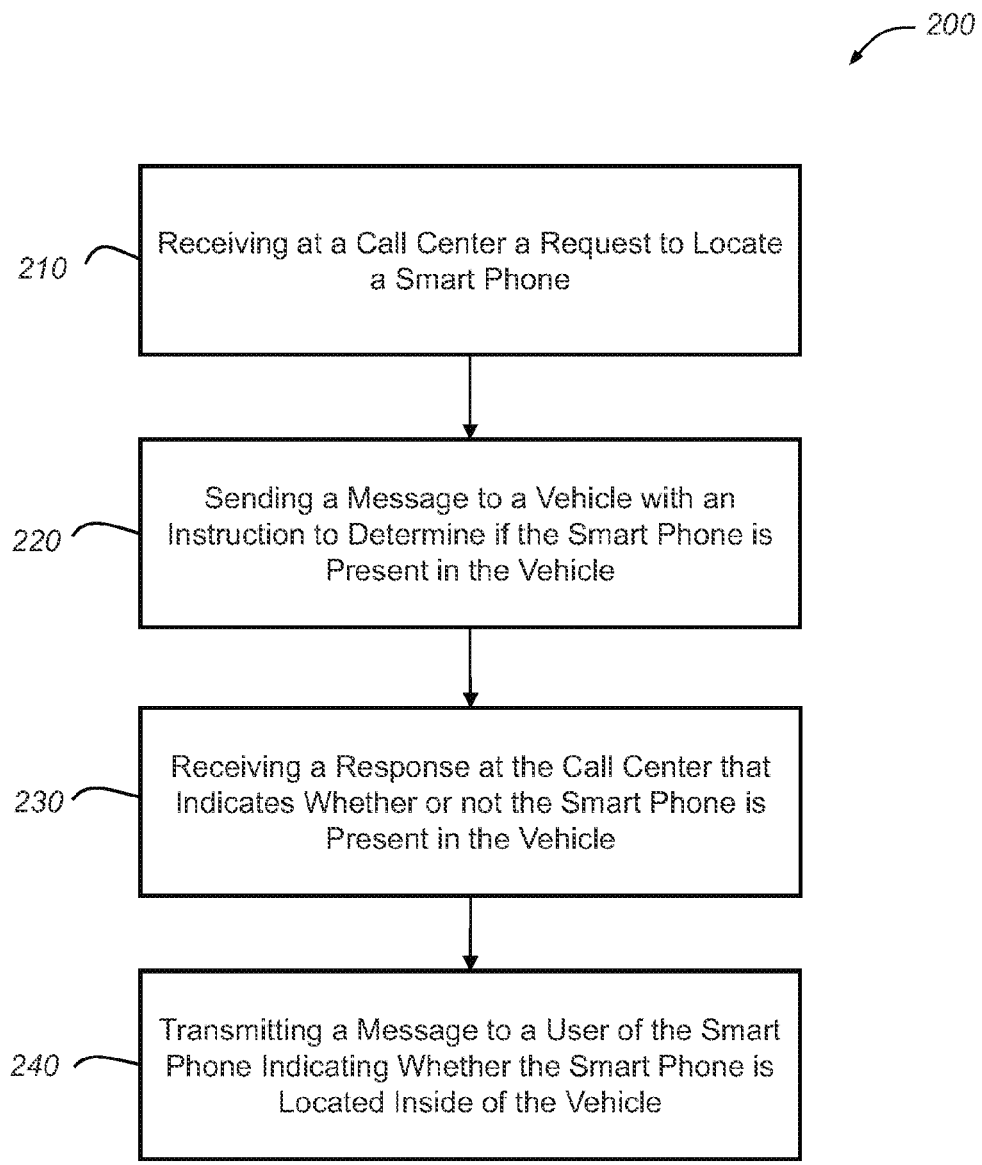
FIG. 2 is a flow chart of an embodiment of a method of determining whether a handheld communication device (HCD) is located inside a vehicle.

Turning now to FIG. 2, there is shown an embodiment of a method 200 of determining whether a handheld communication device (HCD) is located inside the vehicle 12. The method 200 begins at step 210 by receiving at a central facility a request to locate the HCD. The method 200 will be described using the smart phone 57 and the call center 20 as the HCD and central facility, respectively, however it should be appreciated that other handheld wireless devices and central facilities could be substituted with equal success. For example, the computer 18 could be a central facility and a tablet computing device, such as an iPad™, could be used as the HCD. After misplacing the smart phone 57, the vehicle owner can contact the call center 20 to determine whether or not the smart phone 57 is located in the vehicle 12. The vehicle owner could place a telephone call to the call center 20 and ask one of the live advisors 86 or the automated VRS 88 to contact the vehicle 12 and determine if the smart phone 57 is present in the vehicle 12. In another implementation, the vehicle owner could contact the call center 20 through a web portal or website and instruct the call center 20 to contact the vehicle 12 and determine if the smart phone 57 is located in the vehicle. The vehicle owner could select an icon for locating HCDs in the vehicle 12 that is displayed on the web portal. The request can be accompanied by a smart phone identifier, such as a mobile identification number (MIN), a mobile dialed number (MDN), a mobile equipment identification number (MEID), or other similar identifier that can be used to determine whether the smart phone 57 belonging to the vehicle owner is located in the vehicle 12. Additionally or alternatively a vehicle identifier can be provided by the vehicle owner to the call center 20 identifying the vehicle 12 in which the smart phone 57 may be located. The vehicle identifier can be a MIN, MDN, or MEID of the vehicle telematics unit 30, a vehicle identification number (VIN), or other identifying feature of the vehicle 12. In some implementations, the vehicle owner may be associated with a telematics service account such that the smart phone identifier, vehicle identifier, or both are stored at the call center 20 or other similar central facility. That way, the vehicle owner may not have to provide the smart phone identifier or vehicle identifier each time the owner requests to locate the smart phone 57. The call center 20 can then respond to the vehicle owner's request by contacting the vehicle telematics unit 30 of the vehicle 12 that belongs to the vehicle owner. It should be appreciated that the terms "vehicle owner" and "user" are used interchangeably and collectively refer to a person or business organization that has control or use of the vehicle 12, the smart phone 57, or both. The method 200 proceeds to step 220.

At step 220, a message is sent to the vehicle 12 with an instruction to determine if the smart phone 57 is present in the vehicle 12. The call center 20 can construct the message in response to receiving the location request from the vehicle owner and then wirelessly transmit the message to the vehicle telematics unit 30 of the vehicle 12. The message can be generated in any one of a number of forms that are capable of wireless transmission, such as a short message services (SMS) message in which the payload carries the instruction that is readable by the vehicle telematics unit 30. In one implementation, the instruction directs the vehicle telematics unit 30 to detect whether or not the smart phone 57 is communicatively linked with the vehicle 12 via a short-range wireless protocol. For instance, the processor 52 of the vehicle telematics unit 30 can detect the status of short-range wireless connections at the vehicle 12, such as a Bluetooth™ pairing between the vehicle telematics unit 30 and the smart phone 57. The instruction sent to the vehicle telematics unit 30 can include the smart phone identifier, which the vehicle telematics unit 30 can compare with the identity of any HCD wirelessly communicating over a short-range wireless connection or link at the vehicle 12. If the vehicle telematics unit 30 determines that a short-range wireless link exists with a smart phone having the smart phone identifier, the processor 52 of the unit 30 can detect the presence of the smart phone. The vehicle telematics unit 30 can also be configured to detect if it is communicating with any smart phone without regard to a smart phone identifier. And if the vehicle telematics unit 30 determines that it is not communicating with any device identified by the smart phone identifier, the unit 30 can detect this as well.

In another implementation, the message to the vehicle 12 includes an instruction to begin listening for an acoustical signal that is generated by the smart phone 57. The vehicle telematics unit 30 can then initiate a listening period in the vehicle 12 during which time sound generated inside the vehicle 12 can be monitored. For instance, the microphone 32 can receive sound inside of the vehicle 12 and convert the sound into electric signals that are sent to the vehicle telematics unit 30. The vehicle telematics unit 30 can determine the absence or presence of sound at the vehicle 12 based on the electric signals. The vehicle telematics unit 30 could also compare the sound detected at the vehicle 12 with previously-stored sound files each of which contains the recording of the acoustical signal for a particular smart phone. The vehicle telematics unit 30 can compare the sound detected at the vehicle 12 with the previously-stored sound files to identify a match.

A message can also be sent to the smart phone 57 with an instruction to generate the acoustical signal. While or before the vehicle telematics unit 30 is listening for the acoustical signal, the smart phone 57 can be directed to generate the acoustical signal. When the smart phone 57 is in the vehicle 12, the vehicle telematics unit 30 can detect the acoustical signal. Sometimes, the call center 20 may not be able to command the smart phone 57 to generate the acoustic signal because call center 20 and smart phone 57 are operated by different business entities. The call center 20, in those cases, can contact the wireless carrier system servicing the smart phone 57 or another central facility that has permission to direct the smart phone 57 to generate the acoustical signal. For example, if the smart phone 57 is an iPhone™ having cellular service provided by Verizon™, the call center 20 can send a message to Apple™ or Verizon™ requesting that they direct the smart phone 57 to generate the acoustical signal. However, it is also possible to obtain advance permission from the manufacturer or cellular service provider of the smart phone 57 so that the call center 20 can direct the smart phone 57 to generate the acoustical signal rather than requesting the manufacturer or cellular service provider to do so. The method 200 proceeds to step 230.

At step 230, a response is received at the call center 20 from the vehicle 12 that indicates whether or not the smart phone 57 is present in the vehicle 12. The response can be generated at the vehicle 12 and wirelessly transmitted to the call center 20 via the wireless carrier system 14. The response received from the vehicle 12 can be conveyed as part of an SMS message as discussed above or other similar data communication protocol. The response can include data informing the call center 20 that the smart phone 57 is currently connected with the vehicle telematics unit 30 via a short-range wireless link or that the smart phone 57 is not connected via the link. In another implementation, the response can inform the call center 20 that the vehicle telematics unit 30 detected the acoustical signal generated by the smart phone 57 or that the acoustical signal was not detected. The method 200 proceeds to step 240.

At step 240, a message is transmitted to a vehicle owner of the smart phone 57 indicating whether the smart phone 57 is located inside of the vehicle 12. The call center 20 can deliver the message verbally to the vehicle owner that the smart phone 57 has or has not been detected in the vehicle 12. The call center 20 can use the advisors 86 or automated VRS 88 to inform the vehicle owner verbally via a telephone call to a telephone number other than the one used by the smart phone 57. Similarly, the call center 20 could transmit the message indicating whether or not the smart phone 57 is in the vehicle 12 as an SMS message to a telephone number given by the vehicle owner or as an email to an email address provided by the vehicle owner. Alternatively, the call center 20 could transmit the message to web portal or website the vehicle owner used to contact the vehicle 12 to determine if the smart phone 57 is located in the vehicle and display the information included with the message on the web portal. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of determining whether a handheld communication device (HCD) is located inside a vehicle, comprising the steps of:
   (a) receiving at a central facility a request to locate the HCD;
   (b) sending a message from the central facility to the vehicle with an instruction to begin listening for an acoustical signal that is generated by the HCD;
   (c) sending a message from the central facility to the HCD with an instruction to generate the acoustical signal;
   (d) receiving a response from the vehicle at the central facility that indicates whether or not the HCD generated the acoustical signal; and
   (e) transmitting a message from the central facility to a user of the HCD indicating whether the HCD is located inside of the vehicle based on whether or not the vehicle detected the acoustical signal.

2. The method of claim 1, further comprising the step of determining whether the acoustical signal is detected at the vehicle.

3. The method of claim 1, further comprising the steps of receiving a smart phone identifier at the central facility and transmitting the smart phone identifier to the vehicle.

4. The method of claim 1, further comprising the steps of receiving a vehicle identifier at the central facility and transmitting the vehicle identifier to the vehicle.

5. The method of claim 1, further comprising the step of transmitting from the central facility to a second central facility an instruction for the HCD to generate an acoustical signal.

6. A method of determining whether a handheld communication device (HCD) is located inside a vehicle, comprising the steps of:
   (a) receiving at a central facility a request to locate the HCD;
   (b) sending a message from the central facility to the vehicle with an instruction to begin listening for an acoustical signal that is generated by the HCD;
   (c) sending a message from the central facility to the HCD with an instruction to generate the acoustical signal;

(d) determining whether the acoustical signal is detected at the vehicle; and (e) transmitting a message from the central facility to a user of the HCD indicating whether the HCD is located inside of the vehicle based on step (d).

7. The method of claim 6, further comprising the step of storing at the vehicle one or more sound files that each contain a recording of an acoustical signal for a particular smart phone.

8. The method of claim 6, further comprising the steps of receiving a smart phone identifier at the central facility and transmitting the smart phone identifier to the vehicle.

9. The method of claim 6, further comprising the steps of receiving a vehicle identifier at the central facility and transmitting the vehicle identifier to the vehicle.

10. The method of claim 6, further comprising the step of transmitting from the central facility to a second central facility an instruction for the HCD to generate an acoustical signal.

11. A method of determining whether a handheld communication device (HCD) is located inside a vehicle, comprising the steps of:

(a) receiving at the vehicle an instruction to begin listening for an acoustical signal generated by the HCD;

(b) listening at the vehicle for the acoustical signal generated by the HCD in response to a message sent to the HCD from a central facility;

(c) detecting the absence or presence of the acoustical signal generated by the HCD at the vehicle; and (d) transmitting a message to a central facility indicating whether the vehicle detected the acoustical signal.

12. The method of claim 11, further comprising the step of storing at the vehicle one or more sound files that each contain a recording of an acoustical signal for a particular smart phone.

13. The method of claim 11, further comprising the step of receiving a smart phone identifier at the vehicle.

14. The method of claim 11, further comprising the step of receiving a vehicle identifier at the vehicle.

15. The method of claim 11, further comprising the step of transmitting from the central facility to a second central facility an instruction for the HCD to generate an acoustical signal.

* * * * *